Dec. 13, 1960　　H. GOLDSCHMIDT ET AL　　2,964,075
WOODWORKING MACHINE
Filed Jan. 22, 1958　　3 Sheets-Sheet 1
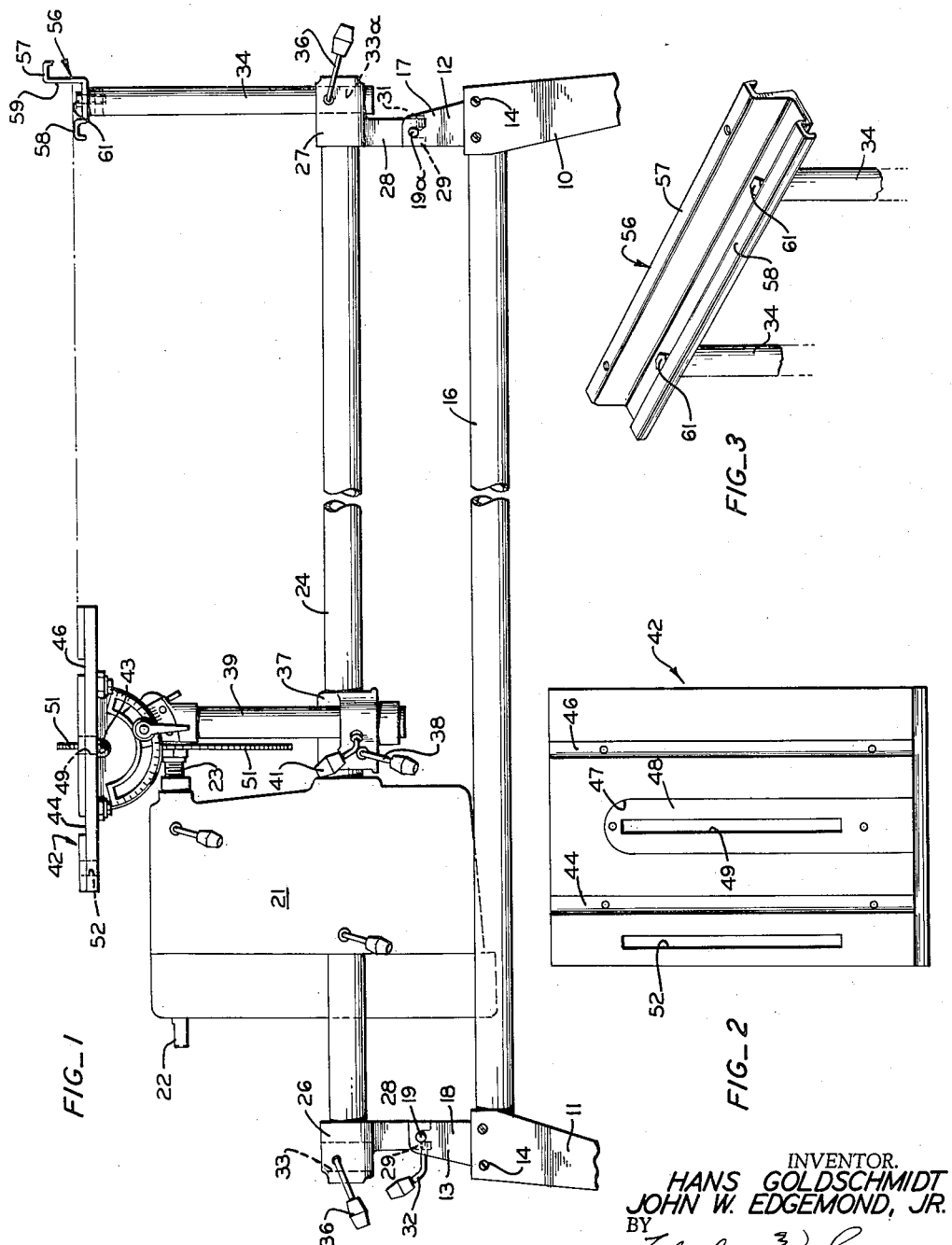
INVENTOR.
HANS GOLDSCHMIDT
JOHN W. EDGEMOND, JR.
BY
ATTORNEYS

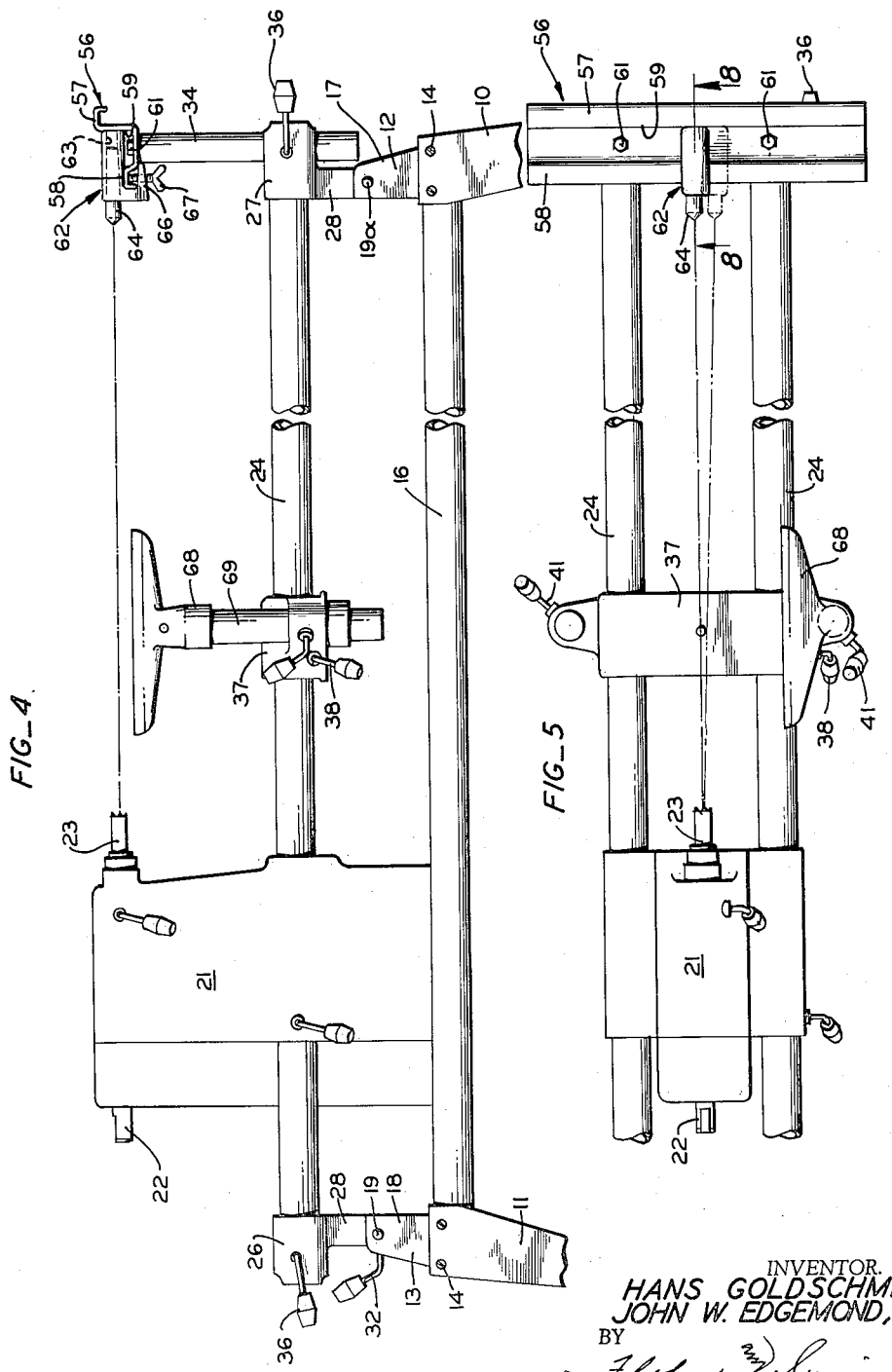

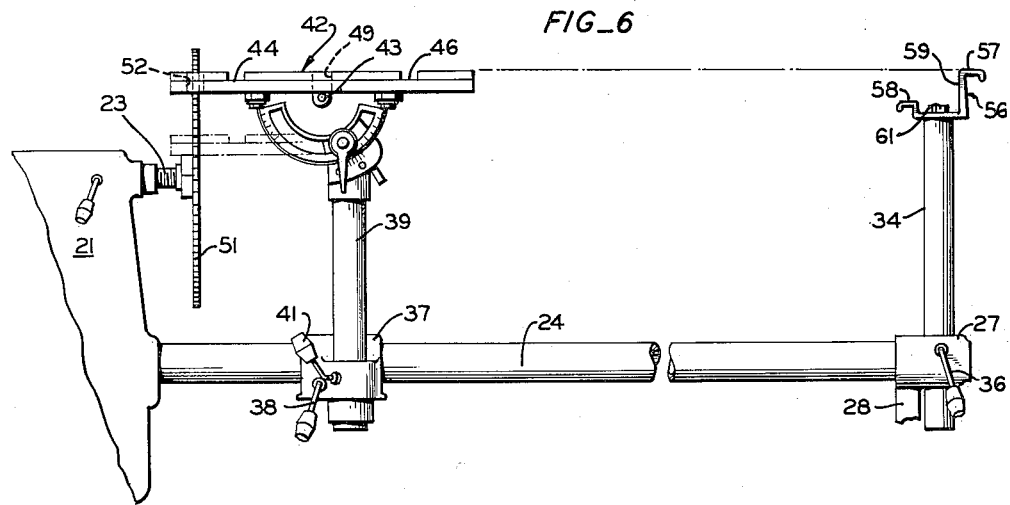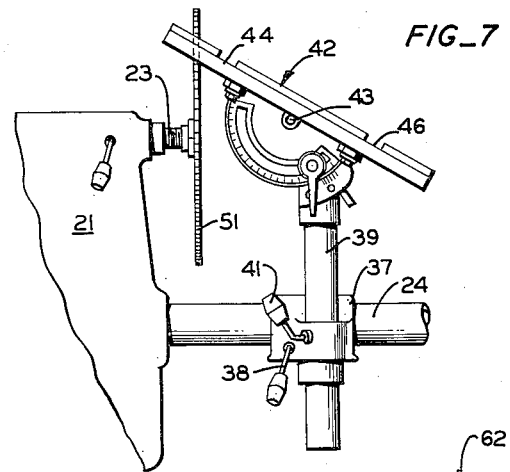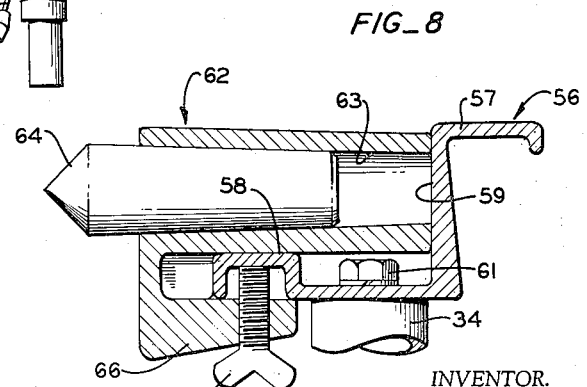

United States Patent Office 2,964,075
Patented Dec. 13, 1960

2,964,075

WOODWORKING MACHINE

Hans Goldschmidt, Atherton, and John W. Edgemond, Jr., Los Altos, Calif., assignors, by mesne assignments, to Yuba Consolidated Industries, Inc., San Francisco, Calif., a corporation of Delaware Filed Jan. 22, 1958, Ser. No. 710,470

3 Claims. (Cl. 143—132)

This invention relates to a combination power tool and particularly to specific improvements to particular components of the "Combination Wood-Working Machine" disclosed in our copending application Serial No. 494,468, filed March 15, 1955, now Patent No. 2,927,612.

Some of the advantages of a combination or convertible tool of this character are that a single motor can be used to power a variety of tools and the tool requires a less amount of space than a comparable number of individual tools. For example, the device disclosed in our copending application can be selectively used as a circular saw, disc sander, lathe, vertical drill press, horizontal drill press, jointer, jig saw, belt sander, band saw, or compressor, and two such tools can be simultaneously driven by a common motor.

Those who are familiar with the operation of the tool disclosed in our said copending application are familiar with the fact that we provide an extension table member which can be mounted upon the tool at a position remote from the conventional saw table and which can be raised or lowered so that its surface is coplaner with the surface of the conventional saw table through which the saw blade projects. The purpose of the extension table of course is to accommodate and support a workpiece which is larger than the normal or conventional saw table. The conventional table and saw are movable horizontally along the ways which support them toward and away from the extension table so that the effective working area provided by the conventional table and the extension table may be increased or decreased. In addition, the operator or user of such a device is familiar with the fact that a rip fence may be mounted upon the extension table to guide one edge of the workpiece during a ripping operation. The distance between the saw blade and the fence may be varied in the manner previously described, that is, the saw blade may be moved toward or away from the extension table member and thus, away from a rip fence which is secured thereto.

It is an object of this invention to provide a single element which is both an extension table and an extension table-fence combination. This single element is movable vertically whereby it may be used either as an extension table or as extension table-fence. By building the two into a single unit we provide a fence which is always parallel to the saw blade. In addition we provide a single simple unit which eliminates the removable and replaceable rip fence.

It is a further object of this invention to provide a combination table-fence table which is adapted to support a tailstock assembly. Since the table and table-fence assembly may be raised and lowered and since the tailstock assembly may be moved laterally therealong, it is apparent that when the device is used as a lathe, it is possible to turn a taper.

In addition, those who are familiar with the operation of the "Combination Wood-Working Machine" disclosed in our copending application are familiar with the saw table construction disclosed therein wherein a single slot is provided through which the blade extends upwardly through the table top. The exigencies of manufacture and the use of such tools customarily dictate the size of the conventional saw table. In order to obtain the widest possible use of such a saw table such a table is customarily provided with a single slot at the center of the table whereby the greatest possible support to the workpiece is offered on both sides of the saw. Such a slot is customarily provided with an insert which may be removed so that a dado or a shaper cutter may be utilized therewith rather than a saw. However there are times when the workpiece is larger than the conventional table and yet the operator may not be able to use the extension table member as, for example, when the conventional table is tilted.

It is an object and advantage of this invention therefore to provide a second slot in a conventional table near one side edge thereof whereby greater table area is achieved by increasing the capacity on one side of the saw blade and reducing it on the other. Such increased capacity will permit the use of a fence, for example, along the opposite edge of the table and increase the capacity between the blade and the fence over that which was previously had.

In addition, the second slot makes it possible to achieve a greater depth of cut because the table can be lowered closer to the drive shaft of the saw and will not engage the housing for the saw motor, for example, as is the case with certain constructions.

Other objects and advantages of our invention will appear from the following specification taken in conjunction with the accompanying drawing in which:

Figure 1 is a side elevational view of a combination power tool showing particularly our new extension table and extension table-fence combination in extension table position, Figure 2 is a plan view of a conventional table construction, Figure 3 is a three-quarter view of our extension table and extension table-fence combination member, Figure 4 is a side elevation of a combination power tool showing a tailstock supported upon our combination extension table and extension table-fence member, Figure 5 is a top view of the device illustrated in Figure 4, Figure 6 is a portional side elevation of our combination power tool showing the saw extending through the second slot and showing our combination extension table and table-fence in extension table position, Figure 7 is a view of the table illustrated in Figure 6 showing the table in tilted position, and Figure 8 is an enlarged cross-sectional detail of the tailstock and tailstock support taken along the line 8—8 of Figure 5.

As illustrated in Figures 1 and 4, our combination power tool is adapted to be supported by a bench assembly which consists of identical end supporting members 10 and 11 which are spaced apart as indicated and which support a pair of substantially identical bench end castings 12 and 13 to which the legs 10 and 11 are secured by means of screws 14. The end members 12 and 13 are provided with a pair of sockets which accommodate the ends of a pair of identical tubular members 16. The members 16, the end castings 12 and 13, and the legs 10 and 11 form the bench. The end castings 12 and 13 are each provided with a pair of upwardly extending lugs 17 and 18 which accommodate pins 19 and 19a.

The tool proper consists primarily of a movable headstock 21 which supports a motor, not shown, and from which a pair of drive shafts 22 and 23 extend. The headstock is movably supported by a pair of tubular ways 24 whose ends are received in sockets in a pair of end castings 26 and 27. The end castings 26 and 27 are provided with downwardly extending solid body members 28 which are provided with channels 29 which fit over and receive the pins 19 and 19a. The outer walls of the channels 29 are provided with threaded orifices, one of which accommodates a threaded member 31 which is adapted to be screwed in and out with respect thereto but which, when screwed in as viewed in Figure 1, engages the lower side of the pin 19a and prevents the member 28 from being removed from the pin 19a but permits it to hinge with respect thereto. The threaded member 32 in the member 26 is likewise adapted to be screwed in and out with respect to its cooperating pin 19. When member 32 is screwed in it engages pin 19 and prevents the member 26 from being raised or lowered about the hinge provided at the other end of the tool or, when it is unscrewed, then the member 26 may be removed from the member 19 with the result that the device may be tilted about the pin 19a.

Each of the members 26 and 27 is provided with a pair of sockets 33 and 33a which are adapted to receive tubular support members 34. Threaded members 36 are adapted to engage similarly threaded bores in the side walls of the sockets 33 and 33a and to frictionally engage members 34 to retain them in predetermined fixed position.

The tubular ways 24 also support a carriage 37 which may be moved therealong and which may be fixed in a particular position by the operation of a pair of camming members which are actuated by the lever 38. The member 37 is also provided with a pair of sockets which are adapted to accommodate a pair of tubular members 39 which are substantially identical to the tubular members 34 and which may be moved vertically within the sockets with respect to the member 37 and which may be retained in a predetermined position therein by the operation of member 41 which is similar to the members 36. A table and its supporting mechanism is mounted at the upper ends of the tubular supporting members 39 and consists generally of a table 42 which is pivotally mounted on a table support and tilt assembly about the point 43. As illustrated particularly in Figure 2, the table 42 is provided with a pair of parallel spaced channels 44 and 46 which are adapted to receive the bar of a miter gauge of the type disclosed in said copending application, Serial No. 494,468, filed March 15, 1955, now Patent No. 2,927,612. The table is also provided with a rabbeted opening 47 for the flush reception of a mating table insert 48 which is provided with a generally rectangular saw slot 49 for the reception of a circular saw 51 which is mounted upon the driven spindle 23.

A second generally rectangular saw slot 52 is positioned adjacent one side edge of the table 42 and is parallel to the saw slot 49 and to the channels 44 and 46.

Operation of the saw table 42 may briefly be described as follows: Let it be assumed that the motor, not shown, which is supported in the headstock 21 is connected to a suitable source of electric power and that the saw blade 51 is properly mounted upon the quill spindle 23. The table 42 is tilted around the pivot point 43 so that its upper surface is positioned at the desired degree of angularity with respect to the blade 51 which is normally operated in a vertical plane. The handle 41 is actuated so that the tubular members 39 are free to move in the sockets in the carriage 37. The table as a whole is raised or lowered with respect to the blade, with the blade passing through the selected slot 49 or 52, and when the desired table height is reached the handle 41 is actuated and the table is locked in that position. The motor is caused to be operated and the saw blade 51 rotates in a vertical plane. The workpiece is positioned upon the table and is caused to engage the saw blade.

If the operator has positioned the table 42 in such a manner that the saw blade 51 passes through the slot 49 as illustrated in Figure 1, then the workpiece is supported equally on both sides of the blade. If the workpiece is small, operation in this manner is satisfactory. If a rip fence is mounted on the table 42 parallel to the blade 51 and the distance between the blade and the side edge of the table is sufficient to accommodate a rip fence and yet permit a piece to be ripped to the desired width, then again, operation of the blade through the slot 49 is satisfactory.

However let it be assumed that after the rip fence has been positioned upon the table 42, that the distance between the rip fence and the blade is insufficient. In this event the operator will cause the blade 51 to pass through the slot 52 increasing the distance between the blade and the rip fence. In another instance, when the workpiece is relatively large and only a small section is to be removed from one end, then during this operation, the operator will cause the blade 51 to be received by the slot 52 and the greater portion of the workpiece will be supported by the table 42.

It will be noted that the plane defined by the upper edge of the headstock assembly 21 is higher than the plane defined by the upper edge of the quill spindle 23. When the blade 51 is caused to pass through the slot 49, the lower limit to which the table 42 can be lowered is defined by the upper surface of the headstock assembly 21. However, when the blade is caused to be operated in the slot 52 the limit to which the table 42 can be lowered is defined by the upper edge of the quill spindle 23. As indicated in Figure 6, in dotted lines, this difference will permit the table 42 to be lowered farther when the blade is operated in the slot 52 thus increasing the depth of cut from a single blade.

The tubular members 34 which are supported in the sockets 33a in the casting 27 support at their upper end a combination extension table and extension table-fence assembly which consists of a single member 56 which may be either molded, extruded or rolled in the form shown in Figures 1, 3, 5, 6 and 8. The member 56 provides a pair of parallel horizontal workpiece supporting surfaces 57 and 58, and a single vertical workpiece guiding surface 59.

The surface 57 provides a workpiece supporting extension table as is perhaps best illustrated in Figure 6 in which the surface 57 is coplaner with the upper surface of the table 42 and a workpiece which is positioned on the surface 42 will be supported at a position remote therefrom by the extension table surface 57. As has previously been pointed out, by operating the member 36, the tubular supports 34 may be loosened in the sockets 33a in the member 27 whereby they may be moved vertically with respect thereto and in this manner the member 56 may likewise be raised and lowered. When the surface 57 has been raised or lowered to the plane of the surface of the table 42 then the member 36 may be actuated and the member 57 may be locked in that position.

The surfaces 58 and 59 are referred to as the table-fence surfaces. The surface 58 is a workpiece supporting surface and is parallel to and may be made coplanar with the upper surface of the table 42, in which position it will support the end of a workpiece which is supported upon the table 42. The surface 59 is a workpiece guiding surface and is perpendicular to the plane of the member 58 and is parallel to the plane of the saw blade 51. Thus, the surface 59 is adapted to be engaged by the end or side of a workpiece and to accurately determine the length or width thereof. It is apparent that the surface 58 may function as an extension table even when the workpiece is not caused to engage the fence portion 59.

The surface 58 is channeled to receive the bolts 61 which threadedly engage the tubular members 34 and retain the member 56 thereon. The heads of the members 61, by virtue of the channeling in the surface 58, are below the surface 58 and are not engaged by the workpiece.

From the foregoing it is apparent that I have provided a single member 56 which may be caused to operate as an extension table in which event the workpiece may rest upon the surface 57 or as a combination extension table-fence assembly in which event the workpiece rests upon and is supported by the surface 58 and engages and is guided by the vertical surface 59.

Fine adjustment of the distance between the surface 59 and the saw 51 may be accommodated by actuating the quill spindle 23 along its longitudinal axis or by moving the headstock assembly 21 along the ways 24.

As is illustrated particularly in Figures 4, 5 and 8 the member 56 is adapted to support a tailstock assembly 62. The tailstock assembly 62 consists of a single casting which is provided with a tapered bore 63 which is adapted to receive a similarly tapered tailstock member 64. The member 62 is provided with a rearwardly extending lip 66 which is spaced from the remainder of the member 62 sufficiently that it will provide a channel or recess which engages the surface 58 of the member 56 and the lower side of the member 56 all as is illustrated in Figure 8. The rear end of the member 62 engages the vertical surface 59 and supports the member 62. The lip 66 is provided with an internally threaded bore which is adapted to receive a threaded member 67 which, in turn, is adapted to engage the member 56 as illustrated in Figure 8. Thus, when the member 67 is caused to engage the member 56, the assembly 62 is locked in position and the tailstock 64 is in position for use as illustrated in Figures 4 and 5. The member 62 may be moved laterally along the member 56 so that a taper may be turned.

When our combination tool is used as a lathe the table 42 is removed from the carriage 37 and a tool rest 68, which is mounted on a single tubular member 69, is put in its place, as is illustrated in Figure 5.

The height of the tailstock 64 with respect to the quill 23 is determined by raising and lowering the tailstock assembly 62 and the member 56 in the same manner as the member 56 is raised or lowered when it is used as an extension table or extension table-fence combination.

We claim:

1. In a combination power tool, a headstock, a driven shaft extending from said headstock, a saw blade adapted to be mounted on said driven shaft, a table support adapted to be positioned at predetermined distances from said headstock, a workpiece supporting table supported by said table support, said table being provided with a pair of rectangular saw receiving slots, one of said slots being positioned equidistance from the side edges of said table and the other of said slots being positioned adjacent one side edge of said table.

2. In a combination power tool, a headstock, a driven shaft extending from said headstock, a saw blade adapted to be mounted on said driven shaft, a table support adapted to be positioned at predetermined distances from said headstock, a workpiece supporting table supported by said table support, said table being provided with a pair of parallel miter gauge bar receiving channels and a pair of parallel saw receiving slots, one of said slots being positioned between said miter gauge bar receiving channels and the other of said slots being positioned between one of said miter gauge bar receiving slots and one edge of said table.

3. In a combination power tool, a headstock, a driven shaft extending from said headstock, a saw blade adapted to be mounted on said driven shaft, a table support adapted to be positioned at predetermined distances from said headstock, a workpiece supporting table supported by said table support, said table being provided with a pair of rectangular saw receiving slots, one of said slots being positioned substantially equidistance from the side edges of said table and the other of said slots being positioned adjacent the side edge of said table nearest to said headstock.

References Cited in the file of this patent

UNITED STATES PATENTS

| | | |
|---|---|---|
| 1,104,735 | Morris | July 21, 1914 |
| 1,825,862 | Green | Oct. 6, 1931 |
| 2,045,853 | Hirtz | June 30, 1936 |
| 2,502,124 | Bray | Mar. 28, 1950 |
| 2,517,112 | Jones | Aug. 1, 1950 |
| 2,523,680 | Christie | Sept. 26, 1950 |
| 2,633,221 | Roeder | Mar. 31, 1953 |
| 2,722,243 | Nagy | Nov. 1, 1955 |
| 2,728,363 | Muehling | Dec. 27, 1955 |
| 2,747,626 | Goldschmidt | May 29, 1956 |
| 2,785,711 | Webb | Mar. 19, 1957 |

OTHER REFERENCES

"Shopsmith," Marks, Brochure, Magna Engineering Corp., Menlo Park, California, Mar. 3, 1956 (copy in Div. 29).